United States Patent Office 2,879,162
Patented Mar. 24, 1959

2,879,162

AUGMENTING POULTRY FEED

James T. Baldini, Newark, and Hans R. Rosenberg, Wilmington, Del., assignors to E. I. du Pont de Nemours and Company, Wilmington, Del., a corporation of Delaware No Drawing. Application October 4, 1956
Serial No. 613,840

1 Claim. (Cl. 99—4)

This invention relates to animal feeds containing added fat and free methionine.

This application is a continuation-in-part of our co-pending U. S., patent application Serial No. 431,286, filed May 20, 1954, now abandoned, which in turn is a continuation-in-part of our U. S. parent application Serial No. 403,928, filed January 13, 1954, now abandoned.

We have found that the effect upon growth of added free methionine in poultry feeds is greatest when there is also added fat. There is apparently a cooperation between fat and methionine whereby each is used more effectively in the presence of the other. Without using more than customary amounts of added free methionine greater advantage can be obtained for it by adding fat to the poultry feed.

It is noted that many of the animal feeds in use today are very low in fat. Soybean meal is much used particularly in poultry feed, and the meal available is solvent-extracted so that it contains very little fat. The benefits of the present invention are most pronounced when basic animal feeds of very low fat contents are modified by the addition of fat and free methionine.

By the term animal feed we mean to include not only poultry feed, but also rations for pigs, calves, lambs, and other domestic animals.

The basic animal feed, modified according to the present invention, can be any of those known in the art. These are usually rather complex mixtures containing such nutrient elements as ground wheat, corn, oat groats, fish meal, meat meal, dried milk, soybean oil meal, and alfalfa meal. To these nutrients there is commonly added bone meal, limestone, salt, choline chloride, vitamins, and antibiotics.

Typical poultry feeds, supplemented with methionine, are shown, for example, in a paper by L. D. Matterson and others titled "The Value of Supplemental Methionine in Practical Chick, Starter, and Broiler Rations" in Poultry Science, September 1953, volume 32, No. 5, beginning at page 817. It will be understood that in speaking of poultry feeds herein this is intended to include broadly chick feeds, broiler rations, and in general all feeds for chickens, turkeys, ducks, geese, and other poultry.

As will be shown in the examples hereafter it is often preferred to use diets which are fortified with added vitamins and which contain antibiotics. Though such additives do not need to be included various vitamins and antibiotics can be used in accordance with practices already known in the art of compounding animal feeds.

The basic feed is modified according to the present invention by the addition thereto of an edible fat. By "edible" we mean fats of the kinds included in the diet of animals. This term therefore includes some of the waste fats and oils which are called "inedible fats" because they are unfit for use by humans.

The term "fat" is used herein as is common in the industry to include both fats and oils as well as to include the free fatty acids or derived lipids. The fat may be an edible vegetable fat such as soybean oil, cotton seed oil, corn oil, and sunflower seed oil. The fat may be of animal origin such as beef or pig tallow and other tallows and greases, many of which are waste products of the meat packing industry. Whale oil and fish oils and fats generally can also be used. Tall oil acids obtained from the fractional distillation of tall oil can be used as a replacement for the more customary fats or lipids in the practice of this invention. These tall oil acids principally stearic, oleic and linoleic have a low rosin content and have the advantage over many fats of being liquid at and below ordinary room temperature.

The amount of added fat should be such that the total fat of the feed will amount to form about 5 to 13% by weight of the total composition. More specifically, it is preferred that the total fat amount to from about 5 to 10%.

Methionine, (alpha)-amino (gamma)-methylmercaptobutyric acid,

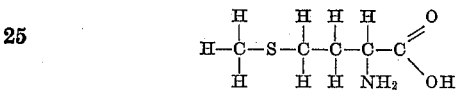

is well-known commercially as an additive to feeds, especially poultry feed. The methionine is customarily used as DL-methionine, a mixture of both the D and L isomers, although the L isomer alone may be employed. The methionine is commonly referred to as "free methionine" to distinguish from the methionine normally present in food stuffs as protein-bound methionine.

When reference is made herein to the use of methionine it will be understood that its known biological equivalents can be used instead. For example, the hydroxy analog of methionine (alpha-hydroxy-gamma-methylmercaptobutyric acid) is commercially available and is a biological equivalent of the acid. Instead of the methionine and its hydroxy analog, the salts and esters of these substituted butyric acids can be employed. There can be used, for instance, the ammonium salt, alkali and alkali earth metal salts such as potassium, sodium, calcium, magnesium and the like. Additionally, the amides of these butyric acids, for example, alpha-hydroxy-gamma-methylmercaptobutyramide, can be used in place of methionine in our invention. Since cystine and homocystine are also known to replace methionine under special conditions, they can also be employed in the products and processes of the present invention.

In order that the invention may be better understood reference should be had to the following illustrative examples:

*Example 1*

A basic broiler ratio was made with the following ingredients with the parts indicated as percent by weight:

| | |
|---|---|
| Corn | 54.525 |
| Soybean meal (solvent extracted) | 35.000 |
| Alfalfa meal | 3.000 |
| Calcite flour | 1.250 |
| Dicalcium phosphate | 1.750 |
| "Delsterol" (1500 I.C.U./gm.) | 0.050 |
| Iodized salt | 0.250 |
| Choline chloride | 0.150 |
| Manganese sulfate, feed grade (85%) | 0.025 |

Vitamin and antibiotic supplement _____ 1.000

Containing: Mg./g. of the vitamin supplement

| | |
|---|---|
| Procaine penicillin G | 0.22 |
| Thiamine. HCl | 0.4 |
| Riboflavin | 0.7 |
| D-Ca pantothenate | 2.2 |
| Pyridoxine. HCl | 0.7 |
| Niacin | 3.5 |
| Para-aminobenzoic acid | 10.0 |
| Biotin | 0.02 |
| Folic acid | 0.2 |
| Vitamin K (menadione) | 0.08 |
| Inositol | 100.00 |
| Vitamin $B_{12}$ | 0.0011 |
| Alpha-tocopherol acetate | 0.5 |

Condensed fish solubles                         3.000
                                              ———————
                                              100.000

This basal ration was fed to male New Hampshire chicks for a period of 10 weeks. Duplicate groups of 16 birds each were used per treatment. Other groups of similar birds were given the same basal ration supplemented with graded levels of methionine and corn oil. The methionine and corn oil replaced an equivalent weight of corn. The results of this feeding experiment were as follows:

| | Gain (grams) | Feed/Gain | Index of Performance |
|---|---|---|---|
| Basal | 1,775 | 2.78 | 638 |
| Basal + .05% Methionine | 1,794 | 2.73 | 657 |
| Basal + 3% corn oil | 1,720 | 2.57 | 669 |
| Basal + 3% corn oil + .05% Methionine | 1,861 | 2.60 | 716 |
| Basal + 6% corn oil | 1,769 | 2.47 | 716 |
| Basal + 6% corn oil + .05% Methionine | 1,849 | 2.44 | 758 |

*Example 2*

A poultry diet was made up with the following ingredients:

| | Percent by weight |
|---|---|
| Yellow corn | 60.242 |
| Soybean oil meal | 25.000 |
| Corn gluten meal | 2.500 |
| Fish meal | 5.000 |
| Dried whey | 1.000 |
| Alfalfa meal | 3.000 |
| Iodized salt | 0.500 |
| Ground limestone | 1.000 |
| Steamed bone meal | 1.400 |
| Cod liver oil, 3000 A, 400 D | 0.100 |
| "Delsterol" 1500 | 0.050 |
| Choline chloride | 0.190 |
| $MnSO_4$ (85%) | 0.018 |

| | Mg./100 gm. diet |
|---|---|
| Riboflavin | 0.3200 |
| Ca pantothenate | 0.6400 |
| Niacin | 0.9600 |
| Vitamin $B_{12}$ | 0.0040 |

Three percent of corn oil was added, bringing the total fat content to 6%. Methionine was added in the amount of 0.05% by weight. There was added also 0.01% by weight of para-aminobenzoic acid (PABA).

A similar diet was prepared which contained methionine and papa-aminobenzoic acid in the amounts just shown, but omitting the 3% of corn oil which is above shown as added fat.

An experiment using male New Hampshire chicks as in Example 1 was performed. At the end of 8 weeks the following data were obtained:

| | Gain (grams) | Feed/Gain | Index of Performance |
|---|---|---|---|
| Basal incl. .01% PABA | 1,300 | 2.38 | 546 |
| Basal incl. .01% PABA + .05% Methionine | 1,273 | 2.38 | 535 |
| Basal incl. .01% PABA + 3% fat | 1,317 | 2.27 | 580 |
| Basal incl. .01% PABA + 3% fat + .05% Methionine | 1,358 | 2.25 | 616 |

*Example 3*

Two broiler diets were used of the following composition:

| | Diet A, Percent | Diet B, Percent |
|---|---|---|
| Alfalfa meal | 3.000 | 3.000 |
| Corn | 28.525 | 28.525 |
| Peas | 38.000 | 38.000 |
| Condensed fish solubles | 1.500 | 1.500 |
| Soybean oil meal | 17.500 | 17.500 |
| Fiber | 7.000 | |
| Fat | | 7.000 |
| $MnSO_4$ | 0.025 | 0.025 |
| Choline chloride | 0.150 | 0.150 |
| Salts | 0.250 | 0.250 |
| Vitamin $D_3$ (Delsterol) | 0.050 | 0.050 |
| Calcite | 1.250 | 1.250 |
| Dicalcium phosphate | 1.750 | 1.750 |
| Vitamin and antibiotic mixture | 1.000 | 1.000 |
| Total | 100.000 | 100.000 |

Both of these diets were fed to male New Hampshire chicks for a period of 8 weeks. Duplicate groups of 16 birds each were used per treatment. Other groups of similar birds were given the same two basal diets supplemented with graded levels of methionine and the calcium salt of α-hydroxy-γ-methylmercaptobutyric acid (hydroxy analog of methionine).

The results of the experiment are shown in the table which follows:

| Diet | Index of Performance | Gain (Grams) | Feed/Gain |
|---|---|---|---|
| Basal A | 360 | 1,043 | 2.90 |
| Basal A+0.0295% MH Analog [1] | 355 | 1,036 | 2.92 |
| Basal A+0.043% MH Analog | 356 | 1,018 | 2.86 |
| Basal A+0.059% MH Analog | 377 | 1,078 | 2.86 |
| Basal A+0.0886% MH Analog | 349 | 1,004 | 2.88 |
| Basal B | 432 | 1,090 | 2.52 |
| Basal B+0.177% MH Analog | 524 | 1,248 | 2.38 |
| Basal B+0.200% MH Analog | 549 | 1,284 | 2.34 |
| Basal B+0.236% MH Analog | 513 | 1,210 | 2.36 |
| Basal B+0.295% MH Analog | 522 | 1,205 | 2.31 |
| Basal A+0.025% DL-Methionine | 345 | 1,008 | 2.92 |
| Basal A+0.05 DL-Methionine | 349 | 1,003 | 2.87 |
| Basal A+0.075% DL-Methionine | 343 | 1,022 | 2.98 |
| Basal B+0.150% DL-Methionine | 513 | 1,232 | 2.40 |
| Basal B+0.200% DL-Methionine | 540 | 1,247 | 2.31 |
| Basal B+0.250% DL-Methionine | 539 | 1,250 | 2.32 |

[1] MH Analog refers to methionine hydroxy analog.

It is seen that the response for methionine or the methionine hydroxy analog in the absence of fat is practically non-existent, but is remarkable in the presence of fat.

*Example 4*

This example illustrates the effect of adding methionine and fatty acids to a basal poultry diet. As in the above examples, the experiment employed male chicks. At the end of 4 weeks, the following data were obtained:

|  | Gain (grams) | Feed/Gain | Index of Performance |
|---|---|---|---|
| Basal | 390 | 1.92 | 203 |
| Basal+.05% Methionine | 391 | 1.92 | 204 |
| Basal+3% Fatty acids [1] | 384 | 1.88 | 204 |
| Basal+3% Fatty acids [1] +.05% Methionine | 391 | 1.82 | 215 |
| Basal+6% Fatty acids [1] | 367 | 1.86 | 197 |
| Basal+6% Fatty acids [1] +.05% Methionine | 402 | 1.78 | 226 |

[1] Fatty acids are a purified fraction of the non-rosin acids from tall oil. They are essentially a mixture of 50% oleic and 50% linoleic acid.

We claim:

A method for augmenting the feed value of poultry feed comprising the steps of adding 0.01 to 0.2% by weight of a compound selected from the group consisting of alpha-hydroxy-gamma-methylmercaptobutyric acid, alpha-amino-gamma-methylmercaptobutyric acid, an ammonium salt of said acids, an alkali metal salt of said acids, an alkaline earth metal salt of said acids, a lower alkyl ester of said acids, amides of said acids, and mixtures of said salts, and increasing the content of fatty materials of said feed to between 5-13% by weight of said feed by adding tall oil fatty acids.

References Cited in the file of this patent

UNITED STATES PATENTS

| 2,344,229 | Block et al. | Mar. 14, 1944 |
| 2,703,303 | Rickes et al. | Mar. 1, 1955 |
| 2,745,745 | Blake et al. | May 15, 1956 |

OTHER REFERENCES

Morrison: Feeds and Feeding, 21st edition (1951), Morrison Publ. Co. Ithaca, New York, pp. 80 and 1046.